US012578493B2

(12) United States Patent
Olsson

(10) Patent No.: US 12,578,493 B2
(45) Date of Patent: Mar. 17, 2026

(54) USER INTERFACES FOR UTILITY LOCATORS

(71) Applicant: SeeScan, Inc., San Diego, CA (US)

(72) Inventor: Mark S. Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 18/379,065

(22) Filed: Dec. 26, 2023

(65) Prior Publication Data

US 2024/0111069 A1      Apr. 4, 2024

Related U.S. Application Data

(63) Continuation of application No. 17/945,362, filed on Sep. 15, 2022, now Pat. No. 11,796,707, which is a continuation of application No. 16/902,249, filed on Jun. 15, 2020, now Pat. No. 11,460,598, which is a continuation of application No. 15/457,149, filed on Mar. 13, 2017, now Pat. No. 10,690,796, which is a continuation of application No. 14/022,067, filed on Sep. 9, 2013, now Pat. No. 9,599,740.

(60) Provisional application No. 61/786,350, filed on Mar. 15, 2013, provisional application No. 61/699,231, filed on Sep. 10, 2012.

(51) Int. Cl.
| | |
|---|---|
| *G01V 3/08* | (2006.01) |
| *G01V 3/10* | (2006.01) |
| *G01V 3/165* | (2006.01) |
| *G01V 3/02* | (2006.01) |

(52) U.S. Cl.
CPC .................. *G01V 3/08* (2013.01); *G01V 3/10* (2013.01); *G01V 3/165* (2013.01); *G01V 3/02* (2013.01); *G01V 3/081* (2013.01)

(58) Field of Classification Search
CPC . G01V 3/08; G01V 3/10; G01V 3/165; G01V 3/02
See application file for complete search history.

(56) References Cited

U.S. PATENT DOCUMENTS

| | | | | |
|---|---|---|---|---|
| 7,336,078 | B1 * | 2/2008 | Merewether | G01V 3/15 |
| | | | | 324/67 |
| 7,518,374 | B1 * | 4/2009 | Olsson | G01V 11/00 |
| | | | | 324/67 |
| 7,741,848 | B1 | 6/2010 | Olsson et al. | |
| 8,565,920 | B2 * | 10/2013 | Casey | G05D 1/024 |
| | | | | 700/250 |
| 9,800,300 | B2 * | 10/2017 | Caruana | H04B 7/028 |
| 10,042,074 | B2 * | 8/2018 | Bailey | G01V 3/081 |
| 11,300,597 | B2 * | 4/2022 | Olsson | G01V 3/15 |
| 2003/0058961 | A1 * | 3/2003 | Fling | G01V 3/08 |
| | | | | 375/316 |

(Continued)

OTHER PUBLICATIONS

International Searching Authority, "Written Opinion of the International Searching Authority" for PCT Patent Application No. PCT/US13/59082, Mar. 10, 2015, European Patent Office, Munich.

*Primary Examiner* — Kenny S Lin

(74) *Attorney, Agent, or Firm* — Steven C. Tietsworth, Esq.; Michael J. Pennington, Esq.

(57) ABSTRACT

The present disclosure relates to utility locator and user interfaces for use with such locators. Such utility locators may include multiple antennas and sensors for determining and displaying information associated with a buried or otherwise inaccessible utility.

10 Claims, 13 Drawing Sheets

(56)  References Cited

U.S. PATENT DOCUMENTS

| | | | | |
|---|---|---|---|---|
| 2004/0204875 A1* | 10/2004 | Kopken | ............... | G01R 15/185 |
| | | | | 702/64 |
| 2005/0140365 A1* | 6/2005 | Obama | .................... | G07D 7/04 |
| | | | | 324/228 |
| 2005/0156600 A1 | 7/2005 | Olsson et al. | | |
| 2005/0258821 A1* | 11/2005 | Wang | ................. | G01N 33/5438 |
| | | | | 324/200 |
| 2006/0112196 A1* | 5/2006 | Chang | ....................... | G06F 1/28 |
| | | | | 710/14 |
| 2008/0088449 A1* | 4/2008 | Tran | ....................... | H01Q 21/24 |
| | | | | 340/572.1 |
| 2010/0188245 A1 | 7/2010 | Nielsen et al. | | |
| 2011/0148419 A1* | 6/2011 | Cho | ..................... | F41H 11/136 |
| | | | | 324/329 |
| 2011/0273559 A1* | 11/2011 | Yagitani | ................. | G06T 17/00 |
| | | | | 348/135 |
| 2012/0069178 A1 | 3/2012 | Nielsen et al. | | |
| 2013/0200901 A1* | 8/2013 | Olsson | .................. | G01V 3/165 |
| | | | | 324/326 |
| 2014/0012503 A1* | 1/2014 | Haddy | .................. | G06Q 10/08 |
| | | | | 702/2 |

* cited by examiner

100

210

216

212

214

220

238

230

222

232

224

240

234

236

500

510         520

1200 —

1210 —

USER INTERFACES FOR UTILITY LOCATORS

CROSS-REFERENCE TO RELATED APPLICATIONS

This application is a continuation of and claims priority to U.S. patent application Ser. No. 15/457,149, entitled USER INTERFACES FOR UTILITY LOCATORS, filed Mar. 13, 2017, which is a continuation of and claims priority to U.S. Utility patent application Ser. No. 14/022,067, now U.S. Pat. No. 9,599,740, entitled USER INTERFACES FOR UTILITY LOCATORS, filed Sep. 9, 2013, which claims priority under 35 U.S.C. § 119(e) to U.S. Provisional Patent Application Ser. No. 61/786,350, entitled USER INTERFACES FOR ENHANCED UTILITY LOCATORS, filed Mar. 15, 2013, and to co-pending U.S. Provisional Patent Application Ser. No. 61/699,231, entitled USER INTERFACES FOR ENHANCED UTILITY LOCATORS, filed Sep. 10, 2012. The content of each of these applications is incorporated by reference herein in its entirety for all purposes.

FIELD

This disclosure relates generally to user interfaces. More specifically, but not exclusively, this disclosure relates to graphical user interfaces for devices used in locating utilities or buried objects.

BACKGROUND

This disclosure relates generally to graphical user interfaces for buried object locators (also referred to herein as "locating devices"). Such user interfaces may generally be used in utility locators to convey pertinent information regarding a buried or otherwise inaccessible utility line to a user. Some of these user interfaces may be overly complicated and contribute to user error. Other examples of user interfaces on conventional utility locators may be lacking in ability to provide sufficient information in a succinct and clear manner to the user, thus prohibiting the user to efficiently and accurately locate the targeted buried utility.

Accordingly, there is a need in the art to address the above-described as well as other problems.

SUMMARY

The present disclosure relates to user interfaces for enhanced utility locators. Such enhanced utility locators may include a myriad of sensors and other such technologies for determining information regarding the buried or otherwise inaccessible utility line. Some example of enhanced locators and associated configurations and functions are described in co-assigned patents and patent applications including U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Provisional Patent Application Ser. No. 61/485,078, entitled LOCATOR ANTENNA CONFIGURATION, filed on May 11, 2011, U.S. Provisional Patent Application Ser. No. 61/614,829, entitled QUAD-GRADIENT COILS FOR USE IN LOCATING SYSTEMS, filed on Mar. 23, 2012, U.S. Provisional Patent Application Ser. Nos. 61/619,327 and 61/679,672, both entitled OPTICAL GROUND TRACKING APPARATUS, SYSTEMS, AND METHODS, filed on Apr. 2, 2012 and Aug. 3, 2012, U.S. Provisional Patent Application Ser. No. 61/521,362, entitled PHASE SYNCHRONIZED BURIED OBJECT LOCATOR APPARATUS, SYSTEMS, AND METHODS, filed on Aug. 8, 2011, U.S. Provisional Patent Application Ser. No. 61/561,809 entitled MULTI-FREQUENCY LOCATING SYSTEMS & METHODS, filed on Nov. 18, 2011, and U.S. Provisional Patent Application Ser. No. 61/618,746, entitled DUAL ANTENNA SYSTEMS WITH VARIABLE POLARIZATION, filed on Mar. 31, 2012. The content of each of these applications is incorporated by reference herein in its entirety (these applications may be collectively denoted herein as the "incorporated applications").

In one aspect, an enhanced utility locator (also referred to as "locator" herein) may be enabled to allow for real-time depth correction of the buried utility line. In such embodiments a distance sensor may be utilized to calculate the distance the locator is from the Earth's surface. By calculating the distance between the locator and the Earth's surface, a more accurate measurement of the depth of buried utility lines beneath the Earth's surface may also be determined. In such a locator, the user interface may be enabled to display this corrected depth information. For instance, an indicator quantifying this depth may appear on the display for such an enhanced locator.

In another aspect, a user interface may be enabled to display various other icons and indicators relating to corresponding information. These icons and indicators may be used to display, for instance, a GPS lock icon indicating a GPS fix, a corrected depth measurement number of a target utility line, a signal strength measurement of the target utility line, or other information expressly disclosed herein, disclosed by incorporated reference to the abovementioned applications and patents, or otherwise known in the art. Some of the indicators may also be used to display information regarding wirelessly connected devices in a larger locating system such as remaining battery power on enabled transmitters.

In some embodiments, the user interface of a locator may be enabled to indicate current direction on a sensed utility. This may be represented on the user interface by, for instance, a series of chevrons to indicate an upward moving direction of current, a 'V' shape to indicate a downward moving direction of current, or similar directional symbols integrated with the line representing the buried utility. Alternatively, symbols may move in the direction of the current. Similar indicators may be used to indicate a flow direction of water or other liquid.

In another aspect, the user interface may also be enabled to indicate a true depth or soil attenuation corrected depth of sensed buried utility line or lines to the user. This may, for instance, be accomplished through a coloring scheme whereby the sensed utility line may be visually represented on the user interface by a spectrum of different colored lines based on the amount percentage of current loss. In such embodiments, the locator may be enabled to communicate with the transmitter to determine the amount of current being put into the target utility line.

In another aspect, a user interface may be enabled to display tags on each sensed utility line to notate utility type.

For instance, a water icon may appear connected to or otherwise positioned relative to a utility line determined to be a water pipe, or an electricity icon may appear connected to or otherwise positioned relative to a utility line determined to be an electric line. Similarly, a question mark or other icon may appear connected to or otherwise positioned relative to a utility line with undetermined status.

In yet another aspect, the user interface may visually communicate passively connected AC lines to the user. For instance, a single phase line may be represented by a single wavy line whereas an in-ground three-phase line may be represented by three wavy lines. Alternatives to wavy lines are contemplated, including pulsing lines that disappear and reappear periodically. A special notation may also be made for overhead power lines. These lines may also be presented to overlap other sensed utilities, may be depicted in color, or may be depicted with particular design elements on the user interface to indicate they are located above the other utilities.

A line for a first utility that is closer to the locator may appear wider than a line for a second utility that is farther away from the locator. Similarly, shades of colors, different colors, adjustable sizes of images, or other variations in presenting information relating to different utility lines may indicate such relative distance.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
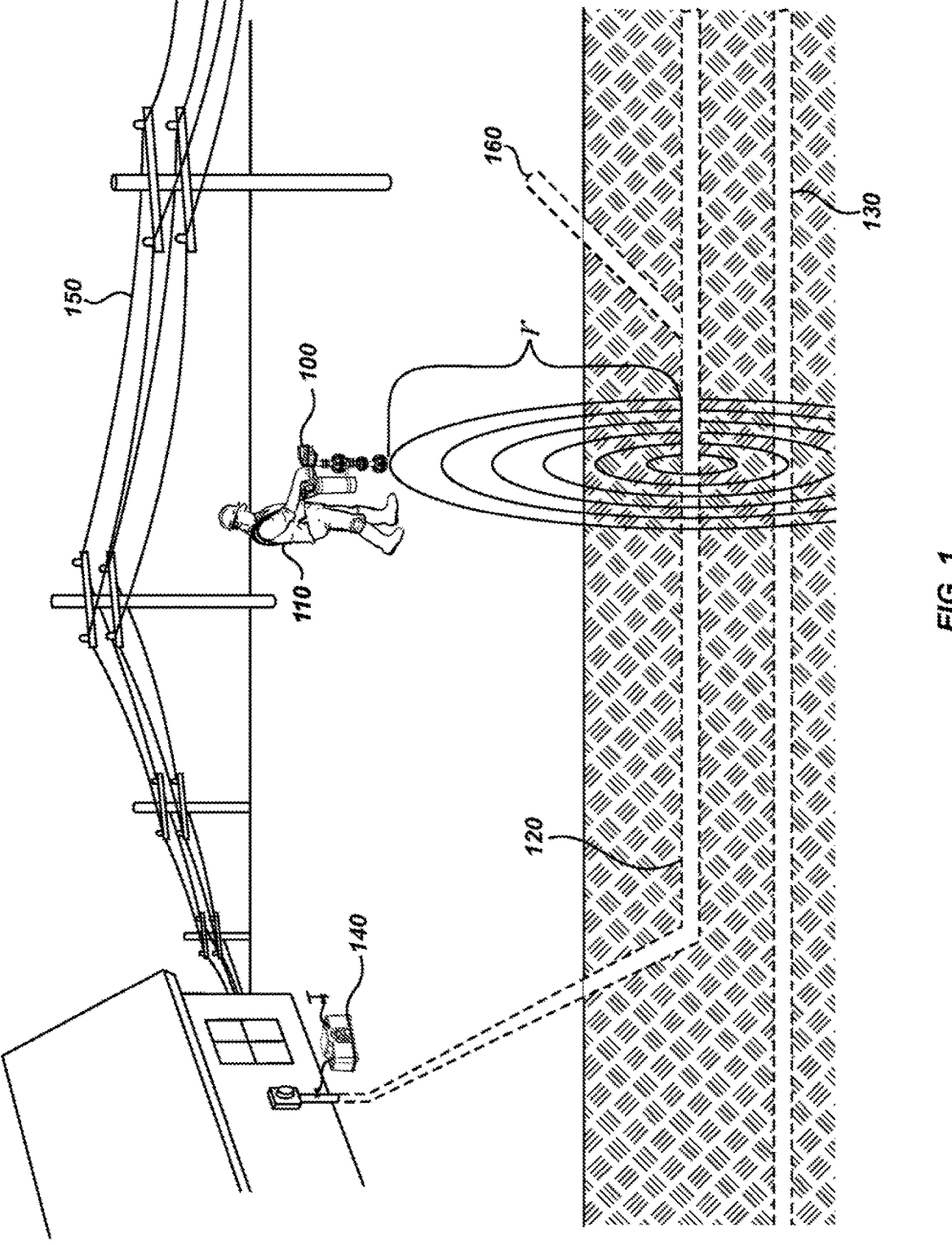
FIG. 1 is an illustration of a locator in use.

The present disclosure relates generally to user interfaces for enhanced utility locators. Such enhanced utility locators may include a myriad of sensors and other such technologies for determining information regarding the buried or otherwise inaccessible utility line. Some examples of enhanced locators and associated configurations and functions are described in co-assigned patents and patent applications including U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Provisional Patent Application Ser. No. 61/485,078, entitled LOCATOR ANTENNA CONFIGURATION, filed on May 11, 2011, U.S. Provisional Patent Application Ser. No. 61/614,829, entitled QUAD-GRADIENT COILS FOR USE IN LOCATING SYSTEMS, filed on Mar. 23, 2012, U.S. Provisional Patent Application Ser. Nos. 61/619,327 and 61/679,672, both entitled OPTICAL GROUND TRACKING APPARATUS, SYSTEMS, AND METHODS, filed on Apr. 2, 2012 and Aug. 3, 2012, U.S. Provisional Patent Application Ser. No. 61/521,362, entitled PHASE SYNCHRONIZED BURIED OBJECT LOCATOR APPARATUS, SYSTEMS, AND METHODS, filed on Aug. 8, 2011, U.S. Provisional Patent Application Ser. No. 61/561,809 entitled MULTI-FREQUENCY LOCATING SYSTEMS & METHODS, filed on Nov. 18, 2011, and U.S. Provisional Patent Application Ser. No. 61/618,746, entitled DUAL ANTENNA SYSTEMS WITH VARIABLE POLARIZATION, filed on Mar. 31, 2012. The content of each of these applications is incorporated by reference herein in its entirety (these applications may be collectively denoted herein as the "incorporated applications").

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

For example, in one aspect, a locator may be enabled to allow for real time depth correction of the buried utility line. In such embodiments a distance sensor may be utilized to calculate the distance the locator is from the Earth's surface. By calculating the distance the locator is from the Earth's surface, a more accurate measurement of the buried utility line's depth within the Earth may also be determined. In such an enhanced locator, the user interface may be enabled to display this corrected depth information. For instance, an indicator quantifying this depth may appear on the display for such an enhanced locator.

In another aspect, a user interface in keeping with the present disclosure may be enabled to display various other icons and indicators. These icons and indicators may be used to display, for instance, a GPS lock icon indicating a GPS fix, a depth measurement number of the target utility line, and a signal strength measurement of the target utility line. Some of the indicators may be used to display information regarding wirelessly connected devices in the larger locating system such as remaining battery power on enabled transmitters.

In some embodiments, the user interface of a locator may be enabled to indicate current direction on a sensed utility. This may be represented on the user interface by, for instance, by a series of chevrons to indicate an upward moving direction of current, a 'V' shape to indicate a downward moving direction of current, or similar directional symbols built into the line representing the buried utility.

In another aspect, the user interface may also be enabled to indicate a true depth or soil attenuation corrected depth of sensed buried utility line or lines to the user. This may, for instance, be accomplished through a coloring scheme whereby the sensed utility line may be visually represented on the user interface by a spectrum of different colored lines based on the amount percentage of current loss. In such embodiments, the locator may be enabled to communicate with the transmitter to determine the amount of current being put into the target utility line.

In another aspect, a user interface in keeping with the present disclosure may be enabled to display tags on each sensed utility line to notate utility type. For instance, a water icon may appear connected to a utility line determined to be a water pipe or an electricity icon may appear connected to a utility line determined to be an electric line.

In some embodiments, the user interface may visually communicate passively connected AC lines to the user. For instance, a single phase line may be represented by a single wavy line whereas an in ground three phase line may be represented by three wavy lines. A special notation may also be made for overhead power lines. These lines may also be made to overlap other sensed utilities on the user interface to indicate they are located above the other utilities.

Various additional aspects, features, and functions are described below in conjunction with FIGS. 1 through 13 of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Devices and User Interfaces Used in
Buried Object Locating Systems

Turning to FIG. 1, a locator such as the locator 100 may be employed by a user 110 to sense buried utilities such as buried utility 120 and buried utility 130. The buried utilities, such as buried utility 120, may be energized with one or more frequencies by a transmitter 140. In some embodiments, a locator may be enabled to also sense one or more signals emitted by a pipe sonde or beacon (not illustrated). Locators may be enabled to visually communicate information to the user. Such information may include, for example, a corrected depth measurement of a target utility, a signal strength measurement, system status information, and other information regarding sensed utility lines. Furthermore, this information may include graphics representing sensed overhead lines such as overhead lines 150 and/or bleed off current from the targeted utility line due to circumstances such as to a divergent branch 160 along the buried utility line 120 or other nearby utility lines such as the buried utility 130.

Figure 2:
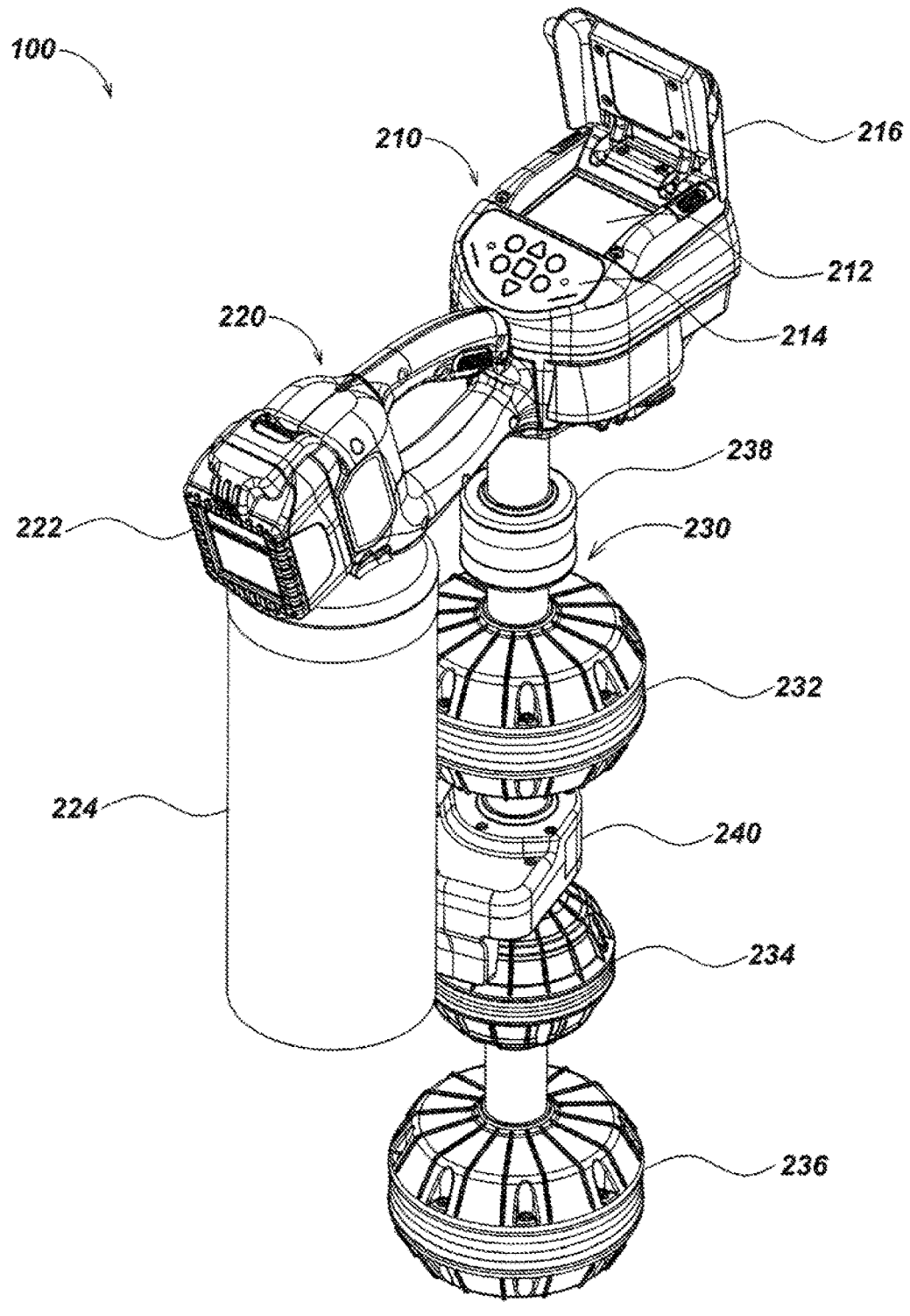
FIG. 2 is an isometric view of one embodiment of an enhanced utility locator.

Turning to FIG. 2, a locator such as the locator 100 may further be composed of a user interface section 210, a handle 220, and a mast 230. The user interface section 210 may further be composed of a display screen 212 and a series of user controls 214. In some embodiments, such as in the locator 100, a screen lid 216 may be included allowing the user to close and protect the display screen 212 when the locator 100 is not in use. In some embodiments of an enhanced locator, other sensor elements may be connected via ports, for instance USB ports, on the front of the user interface section 210. Some of these sensors and apparatus may include, but are not limited to, cameras and GPS sensor elements. The handle 220 may be shaped to allow a user to grip the locator device. A battery 222 may connect to the back of the handle to power the locator 100. Some examples of batteries that may be used in enhanced locators are described in co-assigned patents and patent applications including U.S. patent application Ser. No. 13,532,721, entitled MODULAR BATTERY PACK APPARATUS, SYSTEMS, AND METHODS, filed on Jun. 25, 2012 and U.S. Provisional Patent Application Ser. No. 61/663,617, entitled MODULAR BATTERY PACK APPARATUS, SYSTEMS, AND METHODS INCLUDING VIRAL DATA AND/OR CODE TRANSFER, filed on Jun. 24, 2012. The content of each of these applications is incorporated by reference herein in its entirety. In some embodiments, various other sensors, apparatus, and other elements may also attach to the handle section. For instance, in locator 100, an optical ground tracking apparatus 224 may be secured to the handle 220. Some examples of optical ground tracking apparatus and associated configurations and functions are described in co-pending patent applications including U.S. Provisional Patent Application Ser. No. 61/619,327, entitled OPTICAL GROUND TRACKING APPARATUS, SYSTEMS, AND METHODS, filed on Apr. 2, 2012 and U.S. Provisional Patent Application Ser. No. 61/679,672, entitled OPTICAL GROUND TRACKING APPARATUS, SYSTEMS, AND METHODS, filed on Aug. 3, 2012. The content of each of these applications is incorporated by reference herein in its entirety. The mast 230 of locator 100 may include a series of antenna nodes such as the antenna node 232, antenna node 234, and antenna node 236. The antenna nodes 232, 234, and 236 may all be of various different configurations. Examples of antenna configurations, systems, and methods of use may be described in the various co-assigned patents and patent applications including U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Provisional Patent Application Ser. No. 61/485,078, entitled LOCATOR ANTENNA CONFIGURATION, filed on May 11, 2011, U.S. Provisional Patent Application Ser. No. 61/614,829, entitled QUAD-GRADIENT COILS FOR USE IN LOCATING SYSTEMS, filed on Mar. 23, 2012, U.S. Provisional Patent Application Ser. No. 61/521,362, entitled PHASE SYNCHRONIZED BURIED OBJECT LOCATOR APPARATUS, SYSTEMS, AND METHODS, filed on Aug. 8, 2011, U.S. Provisional Patent Application Ser. No. 61/561,809 entitled MULTI-FREQUENCY LOCATING SYSTEMS & METHODS, filed on Nov. 18, 2011, and U.S. Provisional Patent Application Ser. No. 61/618,746, entitled DUAL ANTENNA SYSTEMS WITH VARIABLE POLARIZATION, filed on Mar. 31, 2012. The content of each of these applications is incorporated by reference herein in its entirety.

Various other sensor elements and apparatuses may also be located along the shaft of the mast 230 such as, but not limited to, a flasher apparatus 238 and a distance sensor element 240. The flasher apparatus 238 may be enabled to provide flashes of light increasing the visibility of the user to oncoming traffic or other such potential hazards. The distance sensor element 240 may be enabled to calculate the distance the locator is from the operating surface and used to more accurately determine the depth of a sensed buried utility. The distance sensor element 240 may include one or more distance measuring sensors such as, for example, a GP2Y0A02YKF sensor unit available from SHARP Microelectronics of Camas, WA. By calculating the distance the locator is lifted from the operating surface, a corrected depth of the targeted buried utility within the Earth's surface may be quantified and communicated to the user in real time. Some embodiments of a locator may also include a series of other sensors such as, but not limited to, accelerometers, gyroscopic sensors, MEMS sensors, and compass sensors. In such embodiments, these sensors may be enabled to provide the locator with inertial navigation capabilities. Additional technologies such as ISM radio, WLAN, or other wireless communication technologies may also be included in embodiments of a locator where wireless communications between the locator and other peripheral devices may be used. Examples of peripheral devices may include, but are not limited to, transmitters or line illuminators, pipe sondes, laptop and tablet computers, and smart phones. Information gathered by a locator may be communicated in various ways including graphically on user interface displays. As used herein, a "peripheral device" or "peripheral devices" may refer to one or more devices used in an overall locating system.

Figure 3:
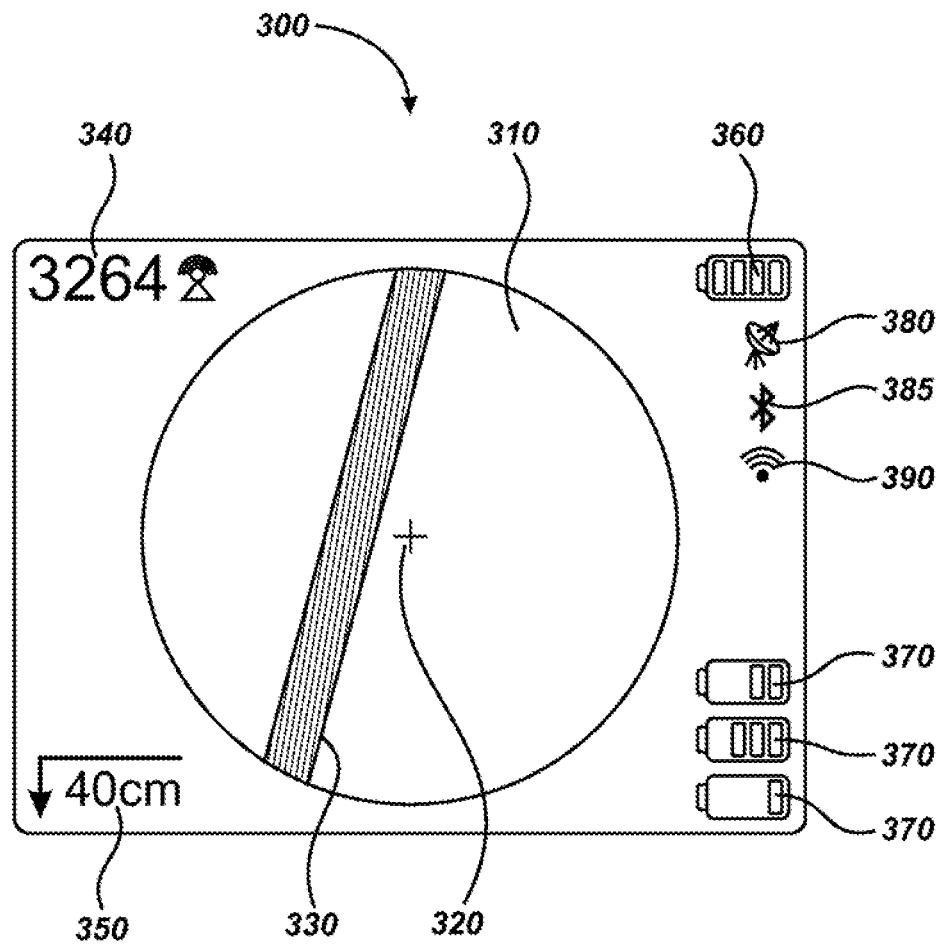
FIG. 3 is an illustration of a user interface showing possible indicators and icons.

Turning to FIG. 3, a user interface display 300 for a locator may largely be rectangular in shape and may have a central circular locating display area 310 surrounded by a series of icons and indicators that may be used to communicate useful information to the user. One of skill in the art will appreciate that dimensions, shapes and positions of the display 300, and its areas, indicators and icons may vary while remaining within the scope and spirit of the invention.

Within the center of the locating display area 310, a reticle 320 may be used to notate the center point of the sensed area with respect to a locator (e.g., locator 100). A utility line 330 may appear within the locating display area 310 to communicate where a sensed buried utility line is located in relation to the locator/user. This line may be formed on display 300 in a myriad of ways to notate specific information regarding the buried utility.

Some of the various different configurations, systems, and methods for graphically representing the line of the buried utility are described in the various co-assigned patents and patent applications including U.S. Provisional Patent Application No. 61/607,510, entitled DUAL SENSED LOCATING SYSTEMS & METHODS, filed on Mar. 6, 2012, U.S. Pat. No. 7,741,848, entitled ADAPTIVE MULTICHANNEL LOCATOR SYSTEM FOR MULTIPLE PROXIMITY DETECTION, issued Jun. 22, 2010. The content of each of these applications is incorporated by reference herein in its entirety. Additional ways of graphically representing the buried utility or utilities are discussed herein.

Various icons and indicators may be included on the user interface display 300 to communicate pertinent information regarding the locating system and buried utility information.

For example, on the top left corner of the user interface display 300, a signal strength indicator 340 may be included that quantifies the strength of current sensed on a buried utility. In embodiments of the enhanced locating system where the locator detects multiple utility lines, multiple corresponding signal strength indicators 340 may be displayed in a manner that coordinates them with their respective utility line indicator 330 (e.g., using color coordination or other visual indicator).

A depth indicator 350 may indicate corrected depth of a targeted buried utility line beneath the Earth's surface as sensed by the locator. The depth number may be corrected by taking the distance 'r' (i.e., the distance between the sensed utility and locator illustrated in FIG. 1) and subtracting the distance between the locator and the Earth's surface as calculated by a distance sensor element. In embodiments of the enhanced locating system where the locator detects multiple utility lines, multiple corresponding depth indicators 350 may be displayed in a manner that coordinates them with their respective utility line indicator 330 (e.g., using color coordination or other visual indicator). Alternately the depth shown may be associated with the line 330 closest to reticle 320.

On the top right corner, a locator battery indicator 360 may be included to communicate remaining power on the battery for the enhanced locator. In embodiments of the enhanced locating system where the locator is enabled to communicate with one or more peripheral devices, peripheral device battery indicators 370 may display information regarding remaining battery power for each wirelessly connected peripheral device. By way of example, the remaining battery power is indicated for three separate peripheral devices resulting in three peripheral device battery indicators 370. In some embodiments, the battery indicators 370 may be sorted. For instance, the closest peripheral device, as determined using radio signal strength, may appear as the top battery indicator 370 while the furthest peripheral device may appear as the bottom batter indicator 370. Some embodiments may color code or otherwise notate which battery indicator 370 belongs to which peripheral device.

A GPS lock icon 380 may also be included to communicate to the user a sufficient lock on a GPS signal. In some embodiments, a blinking icon may indicate no lock. Other icons (not shown) may be used to communicate other location technologies. In some embodiments, line trace and sonde icons may be used to indicate the source of the sensed signal by the locator. Further information regarding line and sonde icons, including methods of detection, may be found in U.S. Provisional Patent Application No. 61/607,510, entitled DUAL SENSED LOCATING SYSTEMS & METHODS, filed on Mar. 6, 2012 and U.S. patent application Ser. No. 13/787,711, entitled DUAL SENSED LOCATING SYSTEMS AND METHODS, filed on Mar. 6, 2013, the entirety of which are incorporated herein. Other possible icons may include a Bluetooth icon 385 and/or a wireless local area network icon 390.

Figure 4:
FIG. 4 is an illustration of a user interface representing current direction on a buried utility line.
Figure 4:
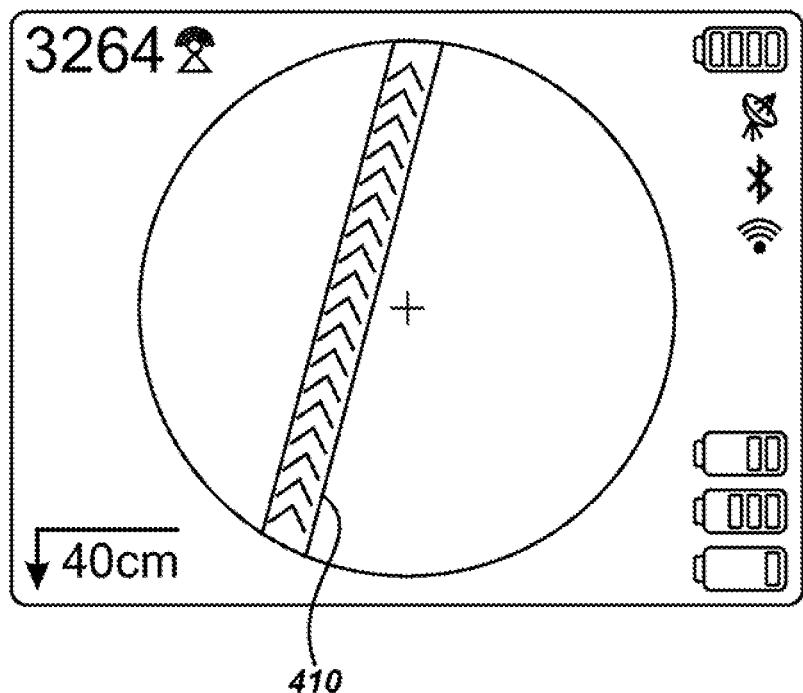

Turning to FIG. 4, a user interface display 400 illustrates a utility line's current direction 410. Direction of the current may be indicated, for instance, as a series of directional icons within the line in itself. The directional icons may be static or dynamic (e.g., the directional icons may appear to move in the apparent direction of the current). In the user interface display 400, a series of chevron-type marks are used to compose the utility line's current direction 410, thus indicating that the current direction is moving in a particular direction with respect to the orientation of the locator. Other indicators of current direction may also be used in alternative embodiments of user interfaces. Those indicators may include different directional icons and/or different manners of display, including moving icons, color changes, and variations in size, among other methods for displaying a direction of current.

Figure 5:
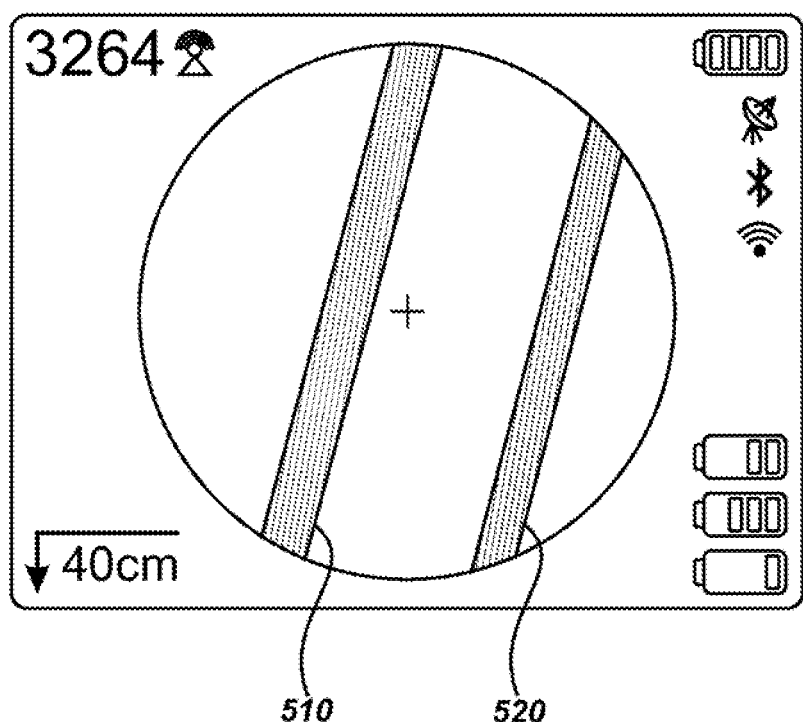
FIG. 5 is an illustration of a user interface illustrating a way of indicating percentage of current loss on the sensed utility or utilities.

Turning to FIG. 5, a user interface display 500 illustrates one way of indicating sensed current strength within sensed utility lines. In such embodiments, knowledge of a current's strength as applied to a target utility line (e.g., as applied by transmitter 140 of FIG. 1) may be needed to perform a "true depth" or soil attenuation correction. With a known amount of applied current, a calculation may be made where the percentage of current loss corrected for distance as sensed on the utility line may be, for instance, visually represented with a color scheme or a size-of-line scheme.

For instance, the user interface display 500 illustrates a low signal loss utility line 510 which may be red in color, and a high signal loss utility line 520 which may be blue in color. In use, a spectrum of colors may be used where low current loss and high current loss may be represented by colors on opposite sides of the spectrum. In some embodiments, a wireless connection may be made between a locator (e.g., locator 100 of FIG. 1) and enable a transmitter (e.g., transmitter 140 of FIG. 1) to wirelessly communicate the amount of current the transmitter is putting into a target utility line. Different colors may not be necessary in some embodiments. For example, shades of the same color may be used to convey the signal loss. When patterns or icons are used to fill or form the lines (e.g., in black/white or grayscale user interfaces), the size or spacing of those patterns of icons may be varied to indicate strengths, depths and other information described herein.

Some embodiments may utilize a frequency mixing or frequency switching scheme where synchronization between the locator and transmitter may be necessary. In such embodiments, an average of the calculated percentage of current loss between the various frequencies may be used to improve the true depth estimation. Further understanding of similar frequency switching schemes may be found in U.S. Provisional Patent Application No. 61/614,829, entitled QUAD-GRADIENT COILS FOR USE IN LOCATING SYSTEMS, filed on Mar. 23, 2012 the entirety of which is incorporated herein. A variety of other schemes for indicating percentage of current loss may be used in various alternative embodiments.

Figure 6:
FIG. 6 is an illustration of a user interface illustrating a way of indicating physical depth of sensed utility or utilities.
Figure 6:
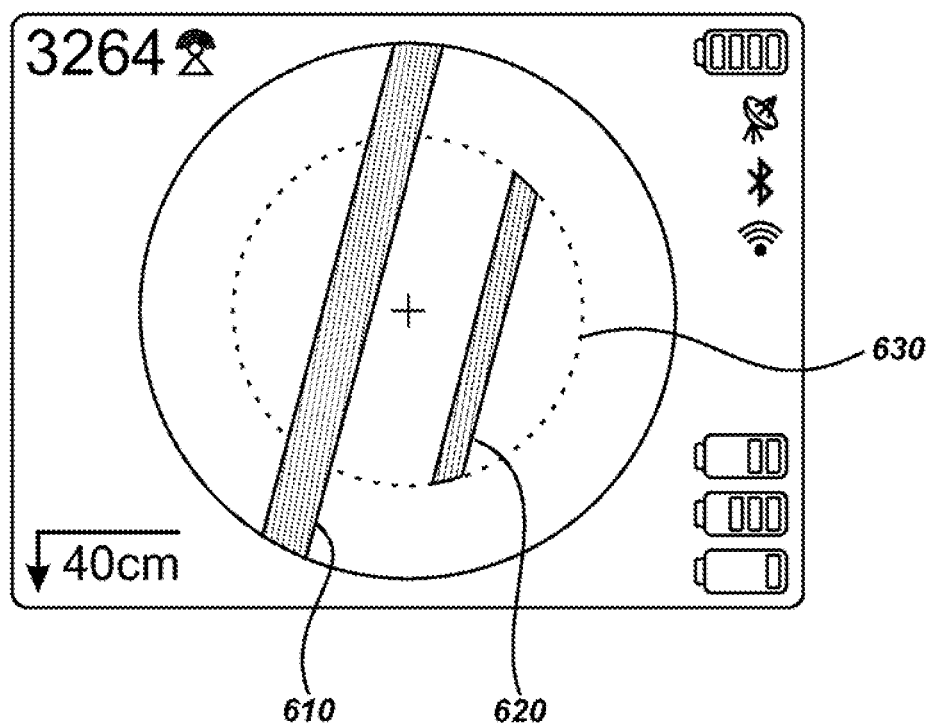

Turning to FIG. 6, a user interface display 600 may visually communicate relative depth (or other relative characteristics) of sensed utility lines to the user. The user interface display 600 illustrates a low signal loss utility line 610 and a high signal loss utility line 620. A depth indicator circle 630 is circumscribed by the locating display area. The high signal loss utility line 620 may not extend past the circumference of the depth indicator circle 630 indicating to the user that the high signal loss utility line 620 may be located at a greater depth than the low signal loss utility line 610. In such embodiments a user may be able to easily visually decode the relative depth of sensed utilities. A myriad of other ways of visually communicating the relative depth of the sensed utility lines may also be used in the various alternative embodiments of the present disclosure, including variations in color or fill of the displayed lines, size of the displayed lines, a number corresponding to respective depths, and others. Additionally, overlaying a closer line on top of a deeper line may be used where the lines intersect.

Figure 7:
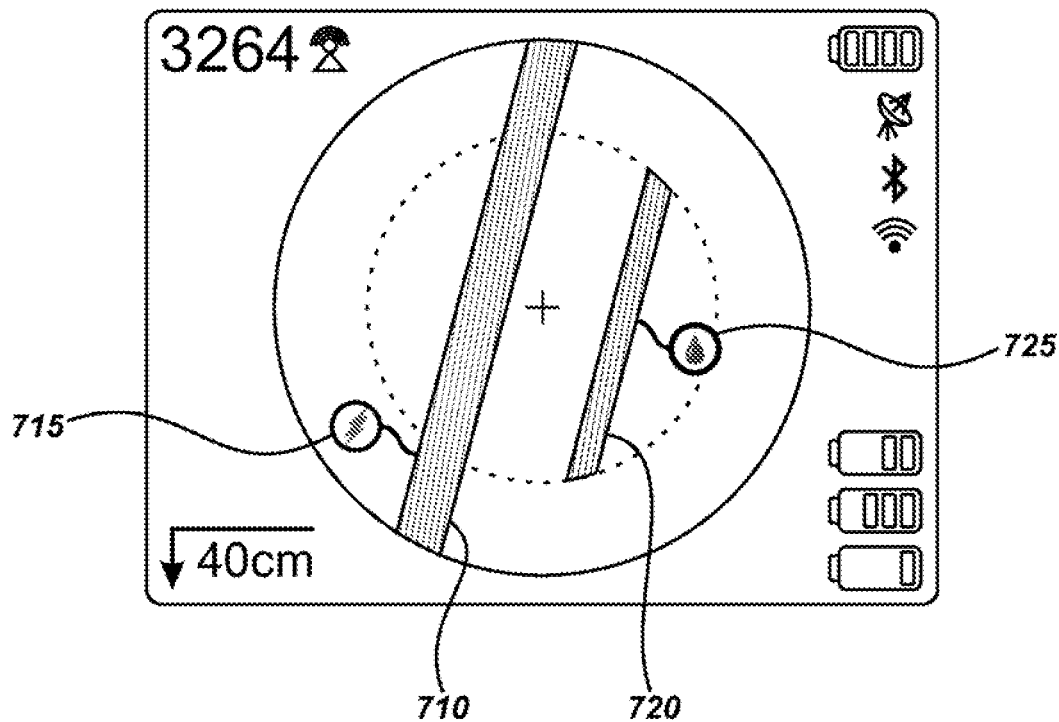
FIG. 7 is an illustration of a user interface illustrating tagging of the buried utility lines.

Turning to FIG. 7, a tagging system may be used to visually represent the different types of sensed utilities. In the user interface display 700 for instance, a low signal loss utility line 710 may be determined to be an electric line and be tagged with an appropriate electric line tag 715. The high signal loss utility line 720 may, on the other hand, be determined to be a water pipe and be tagged with a water line tag 725. In such embodiments, these tags may be colored or patterned to match their corresponding utility line to aid in visually decoupling one tag from the other. Other ways of visually representing the type of the sensed utility lines may also be used in alternative embodiments of user interfaces for enhanced locators, including use of patterns or symbols (e.g., the tags 715 and 725, letters like "E" for electric and "W" for water, etc.) inside outer boundaries of lines to indicate the type of utility.

Figure 8:
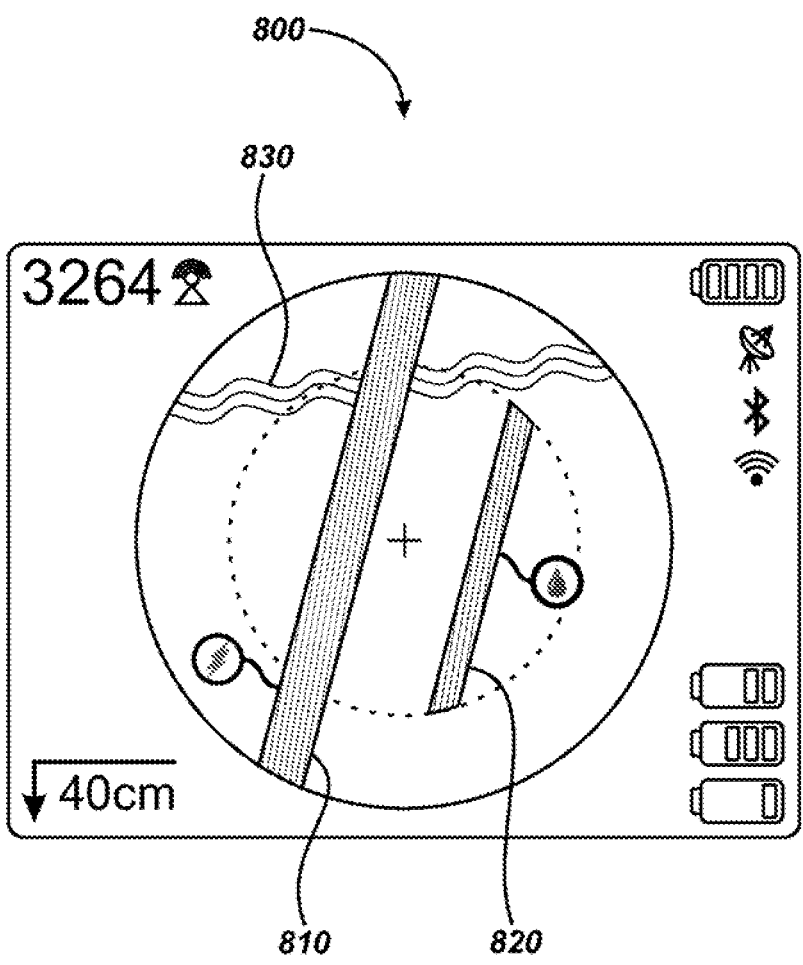
FIG. 8 is an illustration of a user interface illustrating passively sensed AC lines.

In FIG. 8, a user interface display 800 depicts a way of visually communicating passively connected AC lines. The user interface display 800 illustrates a low signal loss utility line 810, a high signal loss utility line 820, and a three-phase utility line 830. In such embodiments, a single phase line may be represented, for instance, as a single wavy line. Overlapping of lines, as seen in the low signal loss utility line 810 and three-phase utility line 830 may be used to indicate which utility is located further within the Earth's surface from the locator. In this embodiment, the low signal loss utility line 810 may be located above the three-phase utility line 830, as the low signal loss utility line 810 overlaps the three-phase utility line 830. Alternative ways of visually representing passively connected AC lines may also be used in various alternative embodiments. Passively detected lines may be displayed in gray scale for example.

Figure 9:
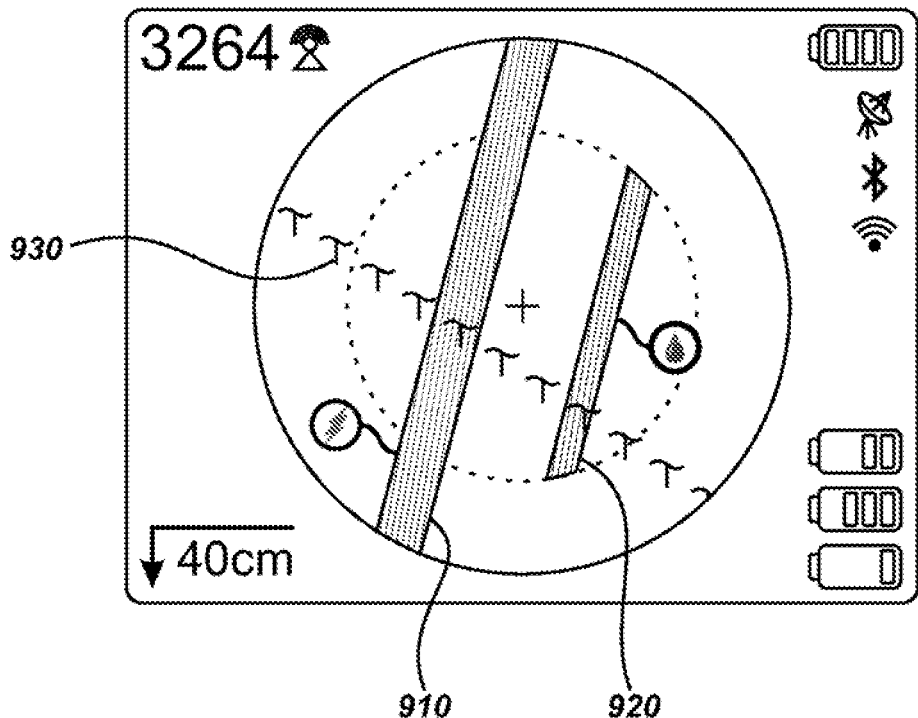
FIG. 9 is an illustration of a user interface illustrating a way of indicating the presence of overhead power lines.

Turning to FIG. 9, overhead power lines may be visually indicated as a special case of three-phase utility lines. The user interface display 900 depicts a low signal loss utility line 910, a high signal loss utility line 920, and an overhead power indication line 930 passing over the other two lines 910 and 920. Since, in physical space, the overhead power lines would be located above ground, and therefore above the sensed buried utilities, the overhead power indication line 930 may be illustrated as overlapping the low signal loss utility line 910 and the high signal loss utility line 920. Presence of overhead power lines may be communicated visually to the user in a myriad of different ways in alternative embodiments.

It is contemplated that user interfaces may display information at different orientations other than the top-level orientation depicted in FIGS. 3 through 9. For example, a cross-section/side view (not shown) may be used to indicate respective depths of lines. Using a side orientation, line 910 would be displayed between lines 930 and 920 along a vertical axis, where line 920 would be displayed below line 910, and line 930 would be displayed above line 910. Similarly, horizontal position information may be provided in the side view to show horizontal offset of each line from the position of the locator. In some embodiments, isometric views may be shown in perspective.

Figure 10:
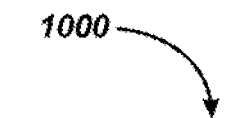
FIG. 10 is an illustration of a user interface illustrating a way of indicating the presence of various utilities.
Figure 10:
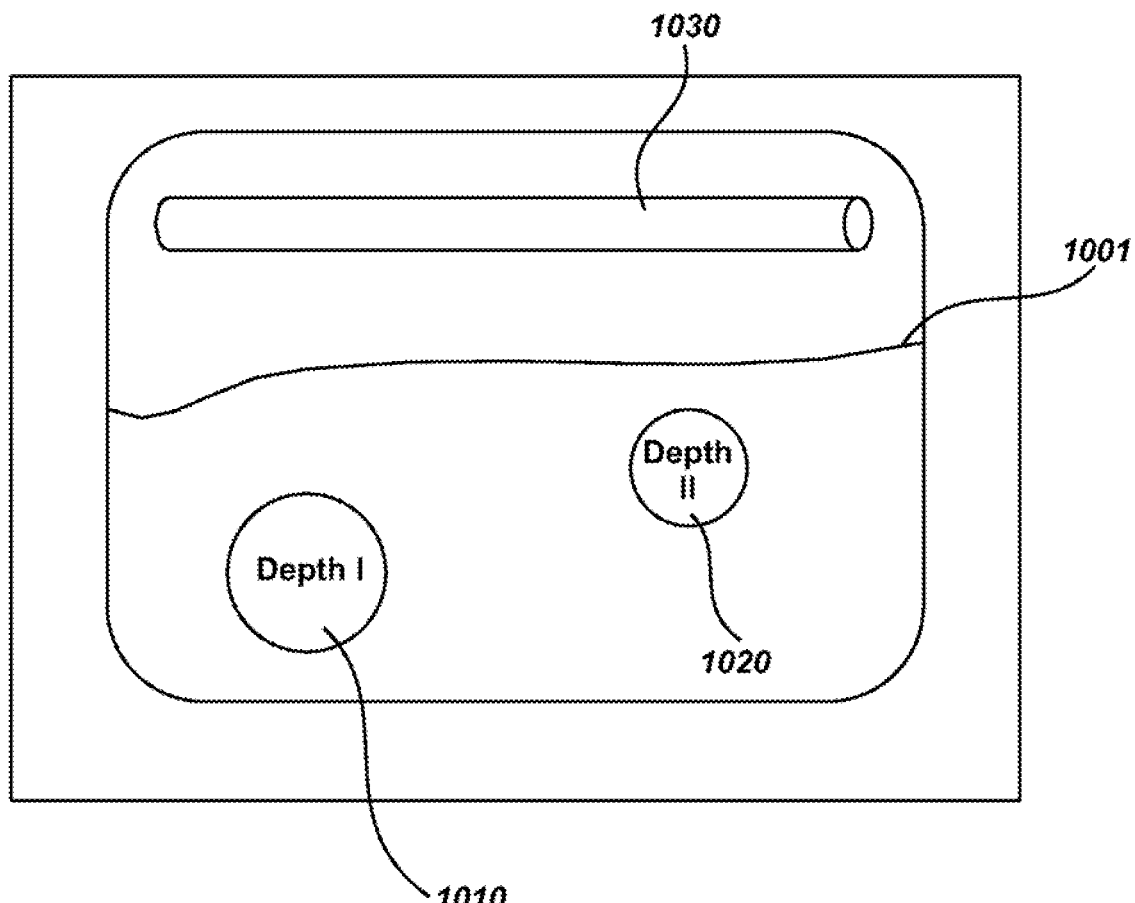

By way of example, FIG. 10 depicts a side view 1000 of lines 1010, 1020 and 1030, which correspond to lines 910, 920 and 930 of FIG. 9. Also shown is the contour of the Earth's surface 1001. Indications of depths and heights may be provided by way of an actual number of the respective depth or height where "Depth I," "Depth II," and "Height" are labeled in FIG. 10. The relative sizes of lines 1010 and 1020 may indicate various characteristics of those lines, including the type of line, the depth of the line with respect to a locator, or other characteristics.

Figure 11:
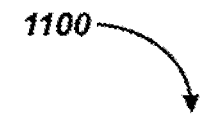
FIG. 11 is an illustration of a user interface embodiment illustrating an example of a cluster of lines representation.
Figure 11:
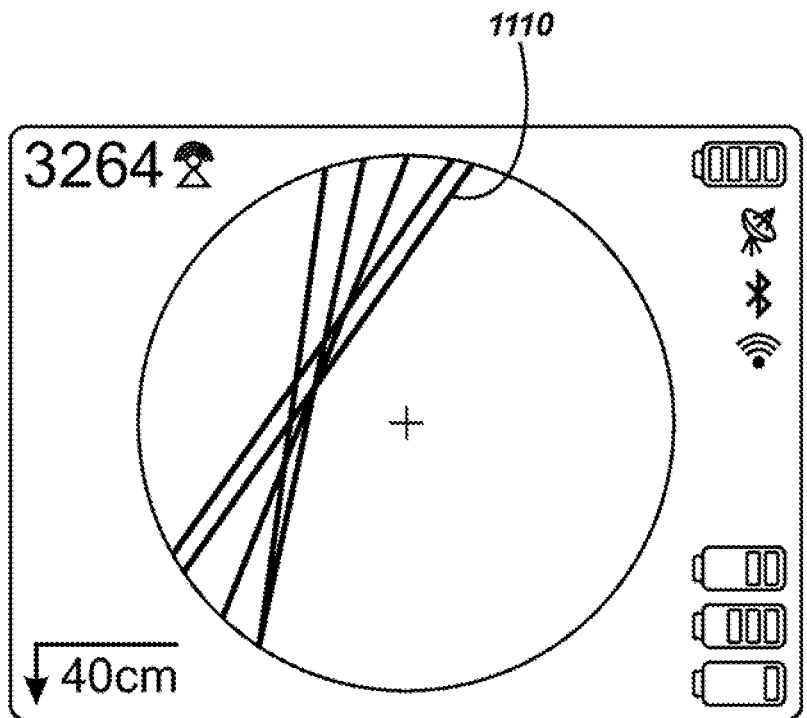
Figure 12:
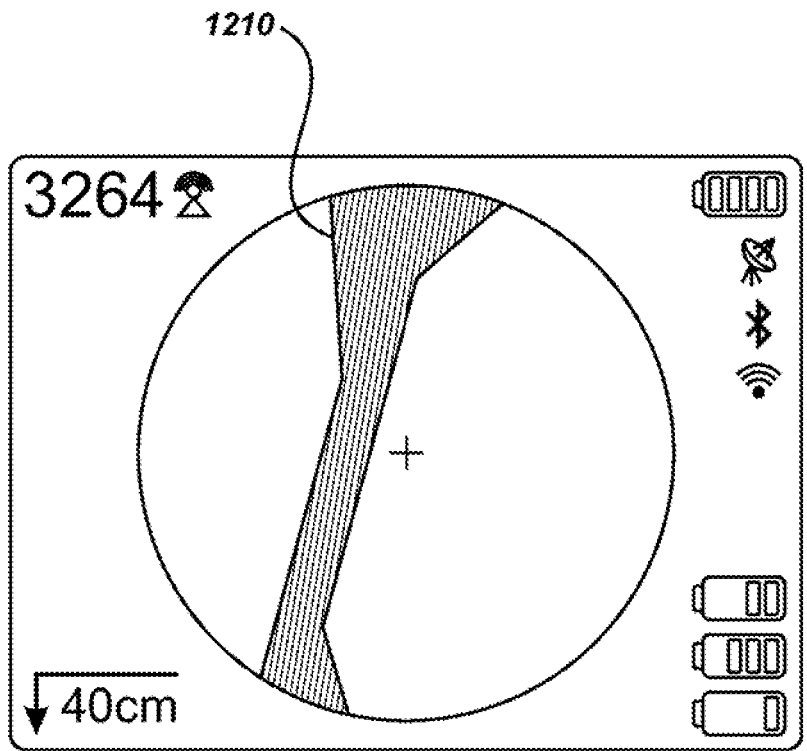
FIG. 12 is an illustration of a user interface embodiment illustrating an example of an envelope of lines representation.
Figure 13:
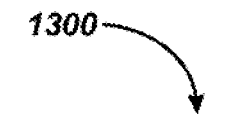
FIG. 13 is an illustration of an embodiment illustrating an example of a refined line representation from a cluster of odd and/or even harmonics.
Figure 13:
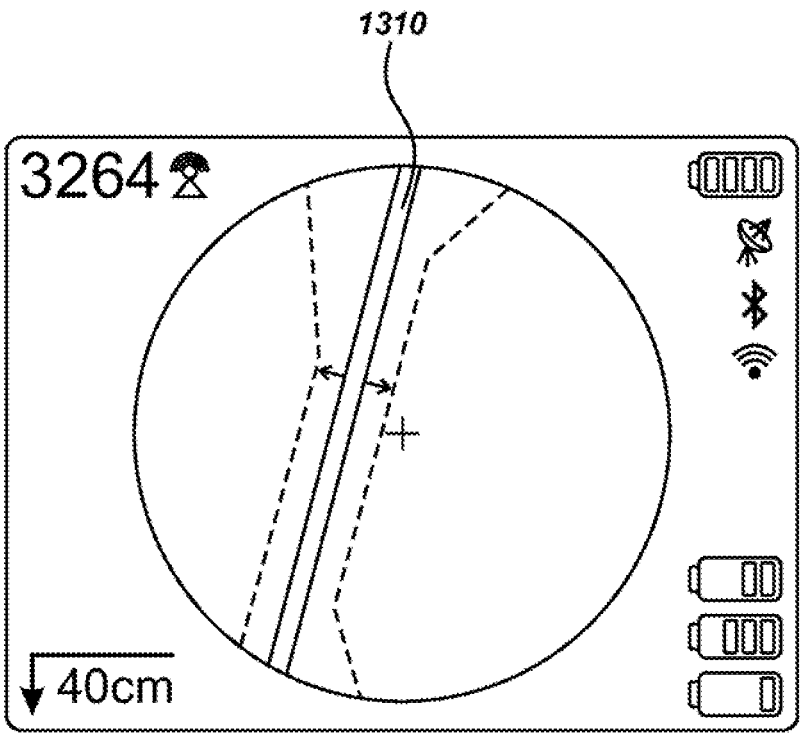

Turning to FIG. 11, some utilities may be illustrated as a cluster of lines representation. For instance, the user interface display 1100 may display a cluster of lines 1110. Alternative embodiments may show an envelope of lines 1210 representation as illustrated in the user interface display 1200 of FIG. 12. In yet other embodiments, the cluster of lines 1110 of display 1100 or the envelope of lines 1210 of display 1200 may be grouped or resolved into one or a few lines such as the grouped line 1310 of the user interface display 1300 of FIG. 13.

Various embodiments of a user interface display in keeping with the present disclosure may be generated to display and/or otherwise indicate additional representations of information or data. Examples of information/data may include, but are not limited to, graphical representations or icons and/or indicators of objects or devices such as manhole covers, transformers, radio-frequency identification (RFID) tags, and/or slack loops. Some embodiments may also code passive versus active lines and/or code power versus high frequency (non-harmonic structure) lines.

Alternatively, a three-dimensional rendering may be displayed on a two-dimensional display to indicate depths/ heights of lines, relative horizontal and vertical positions of those lines, and directions of each line.

It is further contemplated that a display may provide a touchscreen that can be manipulated by a user to, for example, "virtually" move the user around a virtual environment.

One of skill in the art will appreciate that additional indications of other information are also contemplated, including indications of environmental hazards (e.g., traffic, physical obstructions, etc.), and that real-time changes to information may be reflected on the display.

In some configurations, the various systems and modules include means for performing various functions as described herein. In one aspect, the aforementioned means may be a processor or processors and associated memory in which embodiments reside, and which are configured to perform the functions recited by the aforementioned means. The aforementioned means may be, for example, displays, video or other signal processors, video memory or storage devices, logic devices, memory, and/or other elements residing in a buried object locator or other instrumentation device or other device or system on which displays may be provided and/or other modules or components as are described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed in a processing element with a general purpose processor, special purpose processor, digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine, which may be programmed to perform the specific functionality described herein, either directly or in conjunction with an external memory or memories. A processor may also be implemented as a combination of computing devices, e.g., a combination of a DSP and a microprocessor, a plurality of microprocessors, one or more microprocessors in conjunction with a DSP core, or any other such configuration.

As used herein, computer program products or computer program media comprise tangible computer-readable media including all forms of computer-readable medium except, to the extent that such media is deemed to be non-statutory, transitory propagating signals.

The various illustrative functions and circuits described in connection with the embodiments disclosed herein with respect to displays and provided user interfaces and other textual or graphical elements, representations, or functions may be implemented or performed in one or more processing elements with a general purpose processor, a special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The scope of the presently claimed invention is not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the appended claims and their equivalents.

I claim:

1. A utility locator, comprising:
   a housing;
   an antenna array for sensing a buried utility by receiving AC electromagnetic fields in three orthogonal axes therefrom and providing corresponding output signals;
   a distance sensor element, wherein the distance sensor element senses a distance between a reference point on at least one of the antennas of the antenna array and an operating ground surface and provides distance output data;
   a memory;
   a processing element for generating information associated with the buried utility based on the output signals from the antenna array as well as the distance output data, the information including a measurement of distance of the utility below the ground surface;
   signal processing electronics in the locator to process the received AC magnetic field signals as phase-synchronized signals with respect to an associated external utility locator transmitter; and a visual display operatively coupled to the processing element and/or memory for visually communicating the information by rendering the information on the display device.

2. The utility locator of claim 1, further comprising one or more of an accelerometer, gyroscopic sensor, MEMS sensor, and/or a compass sensor.

3. The utility locator of claim 2, wherein the one or more additional sensors provide inertial navigation data to the processing element for determining movement information of the locator.

4. The utility locator of claim 1, further comprising a wireless transceiver module, wherein the wireless module is configured to provide bidirectional communication between the locator and at least one peripheral device.

5. The utility locator of claim 4, wherein the wireless transceiver module communicates via an ISM radio band via a wireless local area network (WLAN).

6. The utility locator of claim 3, wherein the visual display is configured to display one or more icons or indicators representing information related to a position or a motion of the locator and/or the buried utility, wherein the information is generated at least in part from the inertial navigation data.

7. The utility locator of claim 1, wherein the visual display is further configured to show representations of two different utilities located at two different depths, and wherein the representation of one of the two different utilities is in a first color and the second of the two different utilities is in a second color different from the first color.

8. The utility locator of claim 1, wherein the visual display is further configured to show representations of two different utilities are displayed as being of two different utility types.

9. The utility locator of claim 1, further including an optical ground tracking apparatus operatively coupled to the locator, wherein output data from the optical ground tracking apparatus is coupled to the processing element for storage in conjunction with the determined information.

10. A method for displaying information relating to one or more utilities on a user device, comprising:
   sensing, with an antenna array for sensing AC electromagnetic fields in three orthogonal axes, magnetic field signals emitted from a buried utility;
   determining a distance between a reference point on a reference element of the antenna array and an operating ground surface;
   processing, with signal processing electronics associated with the antenna array, the received AC magnetic field signals as phase-synchronized signals with respect to an associated external utility locator transmitter; and
   generating, on a display device, a visual representation of information regarding one or more sensed utilities, wherein the visual representation includes a position and a distance and a depth of the at least one sensed utility with respect to an operating ground surface.

* * * * *